United States Patent
Lewis et al.

(10) Patent No.: US 9,110,984 B1
(45) Date of Patent: Aug. 18, 2015

(54) METHODS AND SYSTEMS FOR CONSTRUCTING A TAXONOMY BASED ON HIERARCHICAL CLUSTERING

(75) Inventors: Glenn M. Lewis, Costa Mesa, CA (US);
Kirill Buryak, Sunnyvale, CA (US);
Nadav Benbarak, Boston, MA (US);
Aner Ben-Artzi, Los Angeles, CA (US);
Jun Peng, San Ramon, CA (US)

(73) Assignee: GOOGLE INC., Mountain View, CA (US)

( * ) Notice: Subject to any disclaimer, the term of this patent is extended or adjusted under 35 U.S.C. 154(b) by 300 days.

(21) Appl. No.: 13/531,147

(22) Filed: Jun. 22, 2012

Related U.S. Application Data

(60) Provisional application No. 61/580,503, filed on Dec. 27, 2011, provisional application No. 61/594,615, filed on Feb. 3, 2012.

(51) Int. Cl.
*G06F 17/30* (2006.01)

(52) U.S. Cl.
CPC ...... *G06F 17/3071* (2013.01); *G06F 17/30598* (2013.01)

(58) Field of Classification Search
CPC .............. G06G 17/3071; G06G 17/30864; G06G 17/30598; G06G 17/30705; G06G 17/30707; G06G 17/30713; G06G 17/30769
USPC ......... 707/737, 736, 705, 739, 732, 738, 748, 707/758, 749, 750
See application file for complete search history.

(56) References Cited

U.S. PATENT DOCUMENTS

| | | | |
|---|---|---|---|
| 6,446,061 B1 | 9/2002 | Doerre et al. | |
| 6,751,614 B1 | 6/2004 | Rao | |
| 6,804,670 B2 * | 10/2004 | Kreulen et al. | 707/999.003 |
| 6,886,007 B2 | 4/2005 | Leymann et al. | |
| 7,082,426 B2 | 7/2006 | Musgrove et al. | |
| 7,158,986 B1 | 1/2007 | Oliver et al. | |
| 7,401,087 B2 | 7/2008 | Copperman et al. | |
| 7,496,567 B1 | 2/2009 | Steichen | |
| 7,567,954 B2 * | 7/2009 | Murakami et al. | 707/999.001 |
| 7,584,100 B2 * | 9/2009 | Zhang et al. | 704/245 |
| 7,593,904 B1 | 9/2009 | Kirshenbaum et al. | |
| 7,664,718 B2 | 2/2010 | Acharya et al. | |
| 7,844,557 B2 | 11/2010 | Acharya et al. | |
| 7,937,345 B2 | 5/2011 | Schmidtler et al. | |
| 7,958,067 B2 | 6/2011 | Schmidtler et al. | |
| 8,055,597 B2 | 11/2011 | Acharya | |
| 8,060,451 B2 | 11/2011 | Degeratu et al. | |
| 8,090,717 B1 | 1/2012 | Bharat et al. | |
| 8,108,376 B2 * | 1/2012 | Okamoto et al. | 707/705 |
| 8,200,506 B2 | 6/2012 | Kil | |
| 8,539,003 B2 * | 9/2013 | Tsyganskiy et al. | 707/804 |
| 8,606,800 B2 * | 12/2013 | Lagad et al. | 707/758 |
| 2003/0130993 A1 | 7/2003 | Mendelevitch et al. | |
| 2006/0095521 A1 | 5/2006 | Patinkin | |

(Continued)

*Primary Examiner* — Jay Morrison
*Assistant Examiner* — Dangelino Gortayo
(74) *Attorney, Agent, or Firm* — Armstrong Teasdale LLP

(57) ABSTRACT

Methods and systems for constructing a taxonomy based on hierarchical clustering are provided. The taxonomy is generated by first constructing a hierarchy of clusters using a clustering algorithm. A first level of the hierarchy of clusters is generated by providing a plurality of content files to a clustering algorithm. Subsequent levels of the hierarchy are generated by providing the clusters of the preceding levels to the clustering algorithm. Labels that characterize each cluster within the hierarchy are assigned to corresponding clusters. Labels and clusters are combined to form the taxonomy.

20 Claims, 5 Drawing Sheets

(56) References Cited

U.S. PATENT DOCUMENTS

| | | |
|---|---|---|
| 2006/0155575 A1 | 7/2006 | Gross |
| 2007/0027830 A1 | 2/2007 | Simons et al. |
| 2010/0017487 A1 | 1/2010 | Patinkin |
| 2010/0094871 A1 | 4/2010 | Ruggieri et al. |
| 2010/0106752 A1* | 4/2010 | Eckardt et al. ............... 707/805 |
| 2010/0122212 A1 | 5/2010 | Boudalier |
| 2010/0223276 A1 | 9/2010 | Al-Shameri et al. |
| 2010/0312769 A1 | 12/2010 | Bailey et al. |
| 2011/0145178 A1 | 6/2011 | Schmidtler et al. |
| 2012/0041955 A1* | 2/2012 | Regev et al. ............... 707/740 |
| 2012/0078969 A1 | 3/2012 | Ananthanarayanan et al. |
| 2012/0102037 A1* | 4/2012 | Ozonat ............... 707/738 |
| 2013/0117267 A1 | 5/2013 | Buryak et al. |

* cited by examiner

METHODS AND SYSTEMS FOR CONSTRUCTING A TAXONOMY BASED ON HIERARCHICAL CLUSTERING

CROSS REFERENCE TO RELATED APPLICATIONS

This application claims priority to provisional patent application Ser. No. 61/580,503 filed on Dec. 27, 2011, and provisional patent application Ser. No. 61/594,615 filed on Feb. 3, 2012, which are both hereby incorporated by reference in their entirety.

BACKGROUND OF THE INVENTION

This invention relates generally to providing hierarchical clusters of data and, more particularly, to network-based methods and systems for constructing a taxonomy of product issues based on hierarchical clustering.

Organizations and businesses can receive a large number of messages from customers, potential customers, users and/or other people. For example, a business and/or organization can receive messages from its customers and potential customers, such as email messages, messages from online forums, e.g., support forums or message boards, and other types of messages. These messages can be related to a variety of different topics or issues. For example, the messages can be related to problems experienced by a user and can include a request for assistance to solve the problem. Oftentimes, these request messages are directed to a support center at the organization/business.

In addition, the Internet provides these organizations and businesses with access to a wide variety of resources, including web pages for particular topics, reviews of products and/or services, news articles, editorials and blogs. The authors of these resources can express their opinions and/or views related to a myriad of topics such a product and/or service, politics, political candidates, fashion, design, etc. For example, an author can create a blog entry supporting a political candidate and express their praise in the candidate's position regarding fiscal matters or social issues. As another example, authors can create a restaurant review on a blog or on an online review website and provide their opinions of the restaurant using a numerical rating (e.g., three out of five stars), a letter grade (e.g., A+) and/or a description of their dining experience to indicate their satisfaction with the restaurant.

Such a large volume of documents (i.e., different types of electronic documents including text files, e-mails, images, metadata files, audio files, video files, presentations, etc.) can be very difficult for organizations and/or businesses to manage. Entities may try to use clustering techniques to manage such a large volume of documents. Various algorithms can be used on a corpus of documents to produce different clusters of documents such that the documents within a given cluster share a common characteristic. These known clustering algorithms can be very time consuming to execute, and oftentimes provide poor results such as clusters having many unrelated documents.

Accordingly, it would be desirable to provide a computer system for organizing large volumes of electronic documents within hierarchical clusters wherein the documents within each cluster relate to a particular topic, and for determining a label for each particular topic. It would also be desirable to provide a computer system configured to determine a label for each cluster containing documents directed to a particular topic.

BRIEF DESCRIPTION OF THE INVENTION

In one embodiment, a computer system that includes instructions stored on a computer-readable medium and executable by at least one processor is provided. The computer system includes a cluster controller configured to cause at least one processor to generate a hierarchy of clusters. The hierarchy of clusters includes at least two levels, and each cluster within a first level of the hierarchy of clusters includes at least one content file. Each cluster within a second level of the hierarchy of clusters includes at least one cluster of the first level of the hierarchy of clusters. The computer system also includes a label manager configured to cause the at least one processor to determine a label for each cluster within the hierarchy of clusters and a taxonomy manager configured to cause the at least one processor to output a taxonomy based on the determined labels.

In another embodiment, a computer-readable media having computer-executable instructions embodied thereon is provided. The computer-executable instructions are executed on a computing device in order to instruct the computing device to determine a number of clusters to be included in a first level of a hierarchy of clusters, assign a plurality of content files to the first level of the hierarchy of clusters, generate a first aggregate data file for each cluster in the first level of the hierarchy of clusters, generate a second level of the hierarchy of clusters, determine a label for each cluster in the hierarchy of clusters, and output a taxonomy based on the determined labels.

In another embodiment, a computer-implemented method including executing instructions stored on a computer-readable medium is provided. The method includes determining a number of clusters to be included in a first level of a hierarchy of clusters, assigning a plurality of content files to the first level of the hierarchy of clusters by applying at least one clustering algorithm to the plurality of content files, wherein each cluster includes at least one content file, generating a first aggregate data file for each cluster in the first level of the hierarchy of clusters by aggregating content data of each content file included within each of the clusters included in the first level of the hierarchy of clusters, generating a second level of the hierarchy of clusters by providing each of the first aggregate data files to the at least one clustering algorithm, determining a label for each cluster included in the hierarchy of clusters, and outputting a taxonomy based on the determined labels.

BRIEF DESCRIPTION OF THE DRAWINGS

FIG. 1 is a block diagram of a system for constructing a taxonomy based on a hierarchical clustering.

FIG. 2 is a flowchart illustrating an exemplary method of constructing a taxonomy based on hierarchical clustering using the system shown in FIG. 1.

FIG. 3 is a block diagram illustrating an exemplary hierarchical clustering of documents using the system of FIG. 1.

FIG. 4 is a flowchart illustrating a more detailed exemplary operation of the system of FIG. 1.

FIG. 5 is a block diagram illustrating exemplary or representative computing devices and associated elements that may be used to implement the systems and methods of FIGS. 1-4.

DETAILED DESCRIPTION OF THE INVENTION

Figure 1:
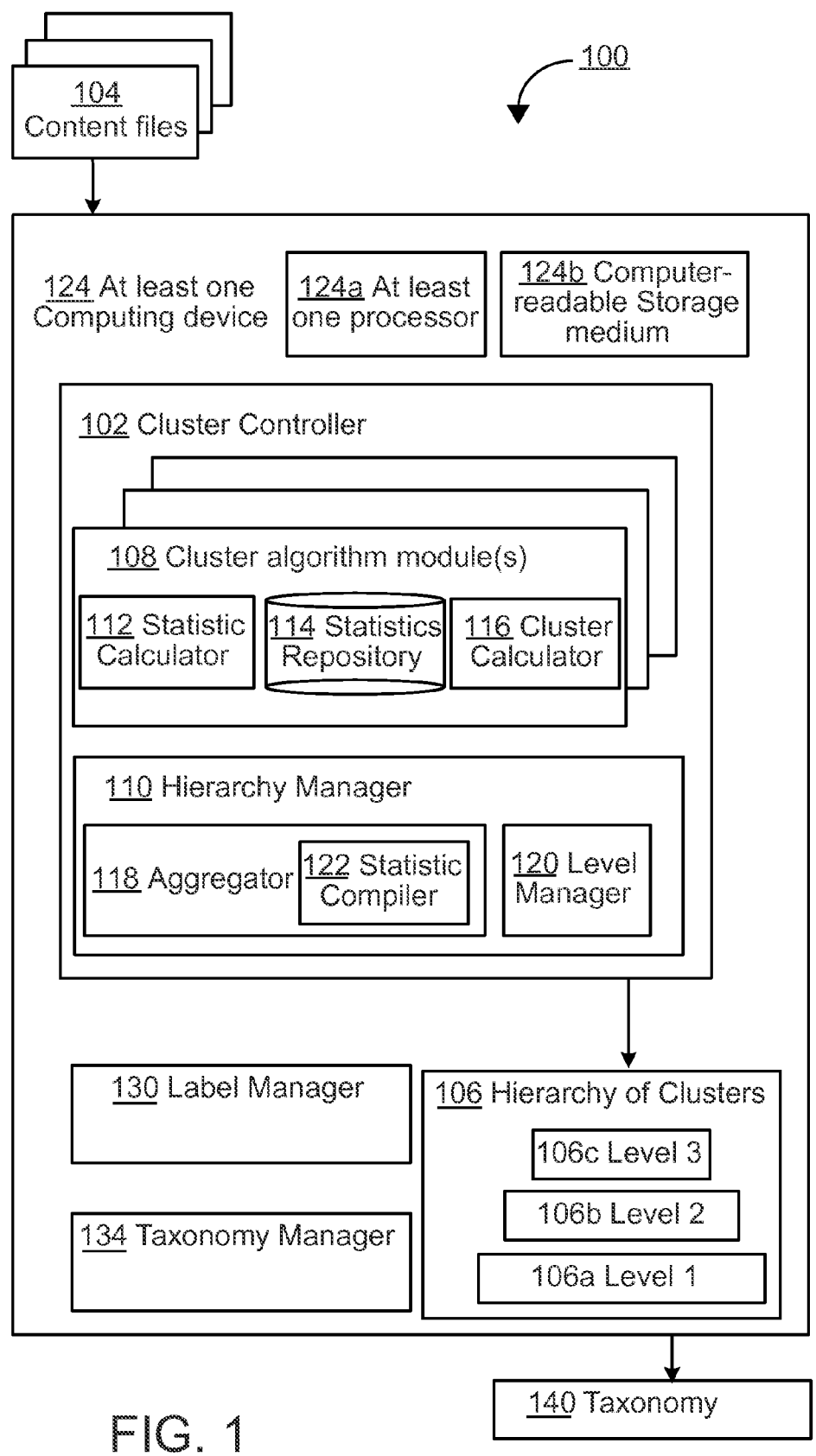
FIGS. 1-5 show exemplary embodiments of the methods and systems described herein.

Embodiments of the methods and systems described herein enable a computing device to receive as input a plurality of content files and generate a hierarchy of clusters based on the content files. A clustering algorithm is used to group related content files into clusters. Successive applications of the clustering algorithm produce the hierarchy of clusters. Using a manual review process, a label for each cluster is determined which identifies the topic of the content files within the cluster. A taxonomy is generated based on the hierarchy of clusters and the determined labels. The taxonomy is outputted for use by a user of the system.

The following detailed description illustrates embodiments of the invention by way of example and not by way of limitation. It is contemplated that the invention has general application to processing electronic documents such as email messages, messages from online forums (e.g., support forums or message boards), other types of messages, web pages, reviews of products and/or services, news articles, editorials, blogs, text files, images, metadata files, audio files, video files, presentations, and other electronic documents by a party in industrial, commercial, and residential applications.

By way of example, and not limitation, the methods and systems described herein may enable a company to discover, define, and refine a detailed hierarchical taxonomy of customer product issues. The detailed hierarchical taxonomy may enable the company to understand the range and nuances of customer issues, and structure internal customer support systems to address each type of issue appropriately and efficiently. A practical application of the detailed hierarchical taxonomy includes proposing recommended solutions to a customer based on a specific issue raised by the customer.

Continuing the example above, a company may use a corpus of customer feedback documents to create a product issues taxonomy using the methods and systems described herein. The customer feedback documents may relate to a number of products. By reviewing the taxonomy, the company may be able to discern which products generate the most customer feedback. The company may use the taxonomy to "drill down" into product issues to better understand the customer feedback. As a specific example, a top level of the taxonomy may include various products or services offered by the company. Drilling down (i.e., traversing a branch of the taxonomy) into a particular service, the company may find that billing issues dominate customer feedback for that service. Moving further into the taxonomy, the company may find specific issues, like payment processing, as one of the dominant issues. Still further, payment processing may be broken down into sub-issues like questions about activation fees, questions regarding account cancellation, and questions about rejected payments. As described herein, the provided methods and systems enable the company to generate a product issues taxonomy from hierarchical clusters of customer support documents. Again, while a product issues taxonomy is provided as an example, many other applications of the methods and systems provided herein are contemplated.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

The methods and systems described herein may be implemented using computer programming or engineering techniques including computer software, firmware, hardware or any combination or subset thereof, wherein the technical effects may include at least one of: a) determining a number of clusters to be included in a first level of a hierarchy of clusters; b) assigning a plurality of content files to the first level of clusters by applying at least one clustering algorithm to the plurality of content files, wherein each cluster includes at least one content file; c) generating a first aggregate data file for each cluster in the first level of clusters by aggregating content data of each content file included within each of the clusters included within the first level of clusters; d) generating a second level of the hierarchy of clusters by providing each of the first aggregate data files to the at least one clustering algorithm; e) determining a label for each cluster included in the hierarchy of clusters; and f) outputting a taxonomy based on the determined labels.

FIG. 1 is a block diagram of a system 100 for providing implicit hierarchical clustering of a group of content files. In the exemplary embodiment illustrated in FIG. 1, a cluster controller 102 is configured to receive a plurality of content files 104, generate a hierarchy of clusters 106, and to output a taxonomy 140. The hierarchy of clusters 106 includes a plurality of hierarchical levels, illustrated conceptually in the example of FIG. 1 as level 1 (106A), level 2 (106B), and level 3 (106C).

In the exemplary embodiment, the hierarchy 106 includes a plurality of hierarchical levels of clusters, in which, a number of clusters at each level decreases as the number of the corresponding level increases. That is, each level beyond, or higher than, the level 106A (i.e., levels 106B . . . 106$n$) generally includes a clustering of clusters included within the immediately lower/preceding level, so that a number of clusters at each level decreases as the number of the corresponding level increases. Thus, the hierarchy 106 may serve to organize the content files 104 in a manner which facilitates a productive and efficient use thereof by the user of the system 100, as described in more detail below.

Specifically, as shown in the example of FIG. 1, the cluster controller 102 may include one or more cluster algorithms modules 108 which, as referenced above, may be configured to receive the content files 104 and to output resulting clusters of the content files 104. In other words, the cluster algorithm modules 108 may generally represent one or more conventional clustering algorithms. Consequently, it may be appreciated that such conventional clustering algorithms are well known in the art, and may include many various features and functions which are not described here in detail, except as where may be necessary or helpful in understanding operations of the system 100 of FIG. 1. For example, the cluster algorithm modules 108 may implement the exchange clustering algorithm or the distributed exchange clustering algorithm, among others.

The cluster controller 102 may further include a hierarchy manager 110 which may be configured to parameterize and otherwise operate the one or more cluster algorithm modules 108 in order to provide the hierarchy of clusters 106. More specifically, as described in detail herein, the hierarchy manager 110 may be configured, e.g., to define a number of levels within the hierarchy of clusters 106, as well as to define a number of clusters at each level (and/or a number of content files within each cluster).

As further described herein, the hierarchy manager 110 may be configured to iteratively construct the hierarchy 106 by receiving an output of the one or more cluster algorithm modules, and thereafter transforming the received output into an input format which is compatible with subsequent input to the one or more cluster algorithm modules 108, to thereby obtain a subsequent level of the hierarchy of clusters 106. In other words, the hierarchy manager 110 may be configured to execute an iterative loop in which clusters that are output by the one or more cluster algorithm modules 108 are individually compiled or otherwise aggregated (i.e., on a cluster by cluster basis) and thereafter provided again to the cluster algorithm modules 108 for further clustering thereof. Thus, each output of the cluster algorithm module(s) 108 may be understood to represent a level of the hierarchy 106, and subsequent cluster-specific aggregation at each such level may be understood to represent a subsequent input to the one or more cluster algorithm modules 108 (to thereby obtain a following level of the hierarchy of clusters 106, and so on).

In this way, one or more otherwise conventional cluster algorithm modules 108 may be utilized to obtain a hierarchy of clusters 106 that is useful in facilitating a desired access to, or other use of, information contained within the content files 104. Moreover, as described, the cluster controller 102 provides for straightforward parameterization of the hierarchy 106.

For example, an operator of the system 100 may easily designate a number of levels 106A-106C . . . 106n of the hierarchy 106, simply by designating a corresponding number of times that the hierarchy manager 110 is configured to iteratively provide an output of the one or more cluster algorithm modules 108 to an input thereof. Further, an operator of the system 100 may designate a number of clusters at each level of the hierarchy 106, because specification of a number of clusters to be output by clustering algorithms is a known parameter of most or all conventional clustering algorithms.

For example, the content files 104 may initially include 100,000 individual content files (e.g., text based documents). In this case, the first level 106A of the hierarchy 106 may be constructed by the cluster controller 102 so as to include 1,000 clusters, each such cluster containing however many of the 100,000 content files are included therein (according to an underlying parameterization of the cluster algorithm module 108 used to construct the first level 106A).

Meanwhile, the second level 106B of the hierarchy 106 may include 100 clusters, where, as referenced above, each of the 100 clusters includes a number of clusters of the underlying 1,000 clusters included in the first level 106A that is dictated by parameterization of the cluster algorithm module 108. Similarly, in the example, the third and final level 106C may include 10 clusters, each of which may contain a number of clusters of the underlying 100 clusters included in the second level 106B.

As described in detail herein, an output of the one or more cluster algorithm modules 108 thus serves as both a level of the hierarchy 106, and as a subsequent input to the one or more cluster algorithm modules 108 for obtaining a subsequent/higher level of the hierarchy 106. In this way, the cluster controller 102 may operate to provide the hierarchy of clusters 106 using otherwise conventional clustering algorithms, without requiring significant additional expertise on the part of the operator of the system 100 (beyond that which is necessary for operation of the otherwise clustering algorithms themselves).

As described further herein, a label manager 130 may be configured to provide a human-readable label, or identifier, to each of the clusters in the hierarchy of clusters 106. The label manager 130 may be configured to present cluster and label information to the operator or operators of system 130 and receive input from the operator or operators. More specifically, the label manager 130 may label each cluster within the hierarchy 106 using a random sampling and manual review process to identify cluster topics and determine an appropriate label. For example, the operator of system 100 may designate a label for each cluster based on the contents of that cluster. Moreover, the label manager 130 may be configured to merge clusters that are sufficiently related. Accordingly, labels may identify the topic of information contained within each cluster. The relationships among clusters defined by hierarchy 106 and the labels affiliated with each cluster are processed by a taxonomy manager 134 to produce a taxonomy 140. Other features and advantages of the system 100 of FIG. 1 are described in more detail herein.

In the example of FIG. 1, the one or more clustering algorithm modules 108 are illustrated as including a number of illustrative subcomponents representing conventional functionalities of the clustering algorithm module(s) 108 in performing clustering of the content files 104. In particular, as shown, the clustering algorithm module 108 may include a statistic calculator 112 which may be configured to receive the content files 104 and to determine a number of statistical measures or other characterizations of the content thereof.

For example, the statistic calculator 112 may compute a number of times that a particular word or phrase appears within each of the content files 104. In another example, the statistic calculator 112 may compute a number or frequency of words and phrases which are determined to have a similar semantic meaning. In still other examples, the statistic calculator 112 may compute measures of various types of metadata related to each content file, rather than, or in addition to, computing statistical characterizations of the content itself. For example, the statistic calculator 112 may compute a number of times that the content files are retrieved from a database, or may calculate information characterizing a source of each content file, e.g., a physical location of storage from which the content files are retrieved, or referring to an identity of an author of each content file. Other examples of calculated statistics are known, or would be apparent.

In conventional clustering algorithms, the selection, definition, and parameterization of such statistical calculations may be known as feature selection, i.e., may refer to a specification of such features or other characteristics which an operator of the clustering algorithm may wish to include as part of the basis for executing the clustering of the content files 104 in question. As is known, specification of such features for a statistical characterization thereof may vary widely depending on circumstance and on preference of individual operators of the system 100. Moreover, different clustering algorithms may be designed to function optimally for specific types of features.

In many of the examples that follow, the content files 104 are discussed as including text-based documents. In such examples, the statistic calculator 112 may be configured to calculate various statistical measures regarding the text within such documents, as described in detail herein. Of course, as otherwise described herein, the content files 104 are not limited to text-based documents, and may include image files, video files, audio files, or virtually any other type of digital media used to store information, or combinations thereof.

During operation, the statistic calculator 112 may be configured to store calculated statistics within a statistics repository 114. For example, in the examples just referenced in which the content files 104 include text-based documents, the statistic calculator 112 may receive each document, and may calculate a number or frequency of specified words, phrases, or other content for the received document. Then, the thus-calculated statistical information for the document in question may be stored in relation to the document within the statistics repository 114. Subsequently, the process of calculating and storing such statistics may be repeated for each of the documents within a specified group of content files, until statistical information for each document is available within the statistics repository 114.

Once the statistics repository 114 is sufficiently completed, a cluster calculator 116 may be configured to utilize the storage statistics to group clusters of the content files 104. Specifically, as referenced above, an operator of the system 100 may parameterize the cluster algorithm module 108 by providing or selecting desired features, which characterize the clustering operations of the cluster algorithm module 108. Such feature selection was described above with respect to operation of the statistic calculator 112, and the same, similar, additional, or alternative features may serve as basis for the clustering operations of the cluster calculator 116.

For example, in the example scenarios referenced above in which the content files 104 include text based documents, then statistics within the statistics repository 114, as described above, may characterize a number and/or frequency of specified words, phrases, or concepts. Then, the cluster calculator 116 may utilize the statistics in clustering the underlying content files 104 (e.g., text documents). For example, the cluster calculator 116 may include all content files containing a specified word a certain number of times or at a certain frequency within a first cluster, and may include other ones of the content files, which contain a different word at the specified number of frequency within a second cluster. Additionally, or alternatively, the cluster calculator 116 may group clusters of the content files 104 based on, e.g., an author of the content file, a number of times each content file has been previously accessed, or on virtually any other characterization of the content file or characteristic of the content files 104.

Thus, the cluster algorithm module 108 may initially input the content files 104, and may output a plurality of clusters of the content files 104. The thus obtained plurality of clusters, as described above, may thus form a level of the hierarchy 106.

At the same time, the hierarchy manager 110 may be configured to render each cluster (and/or information associated with each cluster) suitably for subsequent provision thereof to the cluster algorithm module 108. In this way, the cluster algorithm module 108 may provide an additional or further clustering of the previously obtained clusters for the previous level of the hierarchy 106, so as to thereby provide a further plurality of clusters which form a next-higher level of the hierarchy of clusters 106. As described, this iterative process of feeding an output of the cluster algorithm module 108 to an input thereof may continue until a desired number of levels of the hierarchy of levels 106 have been obtained.

Thus, as illustrated in FIG. 1, the hierarchy manager 110 may include an aggregator 118 which is configured to compile, integrate, concatenate, or otherwise aggregate content (and/or information characterizing the content) of each cluster of the plurality of clusters included within a given output of clusters of the cluster algorithm module 108. In this way, the aggregator 118 may be configured to translate, reformulate, or otherwise render information within or about each cluster in a format that is compatible for further processing (i.e., clustering) by the cluster algorithm module 108. An output of the aggregator 118 may be referred to herein as an "aggregate data file" without limiting the nature or scope of the outputs of aggregator 118. For example, an aggregate data file may include, without limitation, a database entry or a collection of data stored in temporary memory.

As shown, the hierarchy manager 110 may further include a level manager 120 configured to utilize operations of the aggregator 118 in conjunction with the cluster algorithm module 108 to construct the hierarchy 106. In this regard, and as explained in more detail herein, the level manager 120 may be configured, e.g., to designate a number of levels of the hierarchy 106 (e.g., a number of levels desired by an operator of the system 100), and to characterize or parameterize each such level in a desired manner.

Further, the level manager 120 may be configured to manage operations of the aggregator 118 to achieve the desired hierarchy 106. For example, the level manager 120 may be configured to instruct the aggregator 118 as to a number of times necessary to aggregate output of the cluster algorithm module 108 for providing resulting aggregated information back to the inputs of the clustering algorithm module 108. Other examples and details regarding operations of the level manager 120 are provided herein.

Specifically, and continuing the example above in which the content files 104 include text documents, and as described above, the cluster algorithm module 108 may be configured to receive the documents and to output clusters thereof. Then, as instructed by the level manager 120, the aggregator 118 may be configured to receive each cluster of the plurality of the clusters output by the cluster algorithm module 108, and to aggregate the content (or information characterizing the content) of each cluster, so as to thereby render such information in a manner suitable for providing to the input of the cluster algorithm module 108.

As in the example above, it may be appreciated that during such operations, 100,000 documents within the content files 104 may initially be clustered by the cluster algorithm module 108 into 1,000 clusters. Then, for example, each of the 1,000 clusters may contain 100 of the 100,000 documents. Then, the aggregator 118 may be configured to input each cluster of the 1,000 clusters, and to aggregate each of the included 100 documents to produce 1,000 super documents. For example, in the scenario in which the content files 104 included text documents, such aggregation may include concatenation of all the text of the 100 documents of each cluster of the 1,000 clusters. By virtue of such concatenation, the aggregator 118 may effectively provide a text document which, for all intents and purposes of the cluster algorithm module 108, may serve as an otherwise conventional input thereto.

Thus, in the example, the cluster algorithm module 108 may proceed with clustering, effectively, 1,000 documents (i.e., the super documents produced by aggregating each of the 1,000 underlying clusters). Consequently, it may be appreciated that the cluster algorithm module 108 may operate in a substantially conventional manner, i.e., may operate substantially in the same manner as during the initial/previous iteration in which the content files 104 were previously clustered. As a result, the cluster algorithm module 108 may output a subsequent plurality of clusters to thereby form a subsequent, corresponding level of the hierarchy 106. In the example, the 1,000 super documents (i.e., the 1,000 concatenations of each underlying cluster of 100 documents) may be further clustered into 100 clusters, each containing 10 underlying clusters, each of which contains 100 documents. Thus, in the example, the 100 clusters may contain, directly or indirectly, 1,000 content files of the initial set of 100,000 content files 104.

This process may then be repeated for yet a further clustering by the cluster algorithm module 108. In the above example, the cluster algorithm module 108 may receive concatenated versions of documents within each of the 100 clusters, and may thereby operate in an otherwise conventional manner to cluster the concatenated documents, e.g., to thereby obtain a third level of the hierarchy 106 containing 10 clusters. In this way, the hierarchy 106 may be formed as including a decreasing number of clusters at each level 106A-106C of the hierarchy 106. As described, by performing such hierarchical clustering, an operator of the system 100 may be provided with an ability to access information within the content files in a fast and accurate manner, and to perceive patterns of information within the content files 104.

In the simplified examples referenced above in which the content files 104 include text based documents, the aggregator 118 is described as aggregating content of each cluster of a current level of the hierarchy 106 by concatenating text from each document within a cluster to thereby form a single super document. However, it may be appreciated that such examples are provided for illustrating a simplified, conceptual example operation of the aggregator 118, and that many other variations and optimizations of aggregating operations of the aggregator 118 may be used instead.

For example, continuing the example in which the content files 104 include text based documents, the above description gives examples of operations of the statistics calculator 112 in compiling statistics for each text document, and thereafter storing such statistics within the statistics repository 114. As described in the examples, the cluster calculator 116 may thereafter determine clusters to be output from the cluster algorithm module 108 based on the statistics from the statistics repository 114.

Consequently, the aggregator 118 may include a statistics compiler 122 which may be configured to directly compile or otherwise aggregate statistics within the statistics repository 114 to thereby obtain appropriate input for the cluster calculator 116 in calculating a higher level of clusters for the hierarchy 106.

For example, in a simplified scenario in which the content files 104 include text documents which are initially analyzed by the statistics calculator 112 to determine corresponding statistics therefore, such as, e.g., a calculated number or frequency of selected words, phrases, or content, the cluster calculator 116 may group two particular documents within a single cluster output from the cluster algorithm module 108. Subsequently, rather than concatenate the actual content of these two text documents, the statistics compiler 122 may compile the statistics associated with the two documents within the statistics repository 114.

For example, the statistics calculator 112 may determine that a first document includes a given word 100 times, and determines that a second document includes the given word 50 times. Then, the statistics compiler 122 may determine that the cluster which includes the two documents includes the given word a total of 150 times. This information may be reflected within the statistics repository 114, e.g., by storing the compiled statistics in association with the cluster containing the two documents. In other words, for example, the statistics repository 114 may be used in a substantially conventional manner, except that, e.g., the statistics repository 114 may store statistics for a cluster of documents as a whole, rather than storing statistics individually for each underlying document.

Continuing in the example above in which the content files 104 are text documents, the label manager 130 may randomly select a cluster from hierarchy 106. The label manager 130 may present the random cluster, including its related text documents, to the operator or operators of system 100 to determine an appropriate label for the random cluster. The operator or operators of system 100 may provide, e.g., using a GUI, the label which describes a topic of the text documents related to the random cluster. The process of random selection and manual review may continue until all clusters within hierarchy 106 have a label. A second review process may improve the accuracy and specificity of the determined labels. For example, a plurality of clusters from a specific level 106A-106C may be presented to the operator of system 100. The operator may determine, based on a review of the text documents related to the plurality of clusters (and/or the labels of the plurality of clusters), that two or more clusters are so closely related that their corresponding labels may be considered to describe the same topic. Accordingly, the operator may, using a GUI provided by the label manager 130, selectively merge the two or more related clusters to form a new cluster. The label manager 130 may determine a label for the new cluster based on a label of a constituent cluster of the new cluster or the operator may provide a new label. Additionally, or alternatively, as part of the second review process, the operator of system 100 may determine a new label for any of the clusters in hierarchy 106.

The above description provides many examples of operations, features, and functions of the system 100 of FIG. 1. Nonetheless, it may be appreciated that the system 100, and similar systems, may include or be associated with many other variations and implementations. For example, in a simplified operation of the system 100, the hierarchy manager 110 may use a single cluster algorithm module 108 to construct each level of the hierarchy 106. In such examples, the single cluster algorithm module 108 may be parameterized consistently for each level 106A-106C. That is, for example, the selected cluster algorithm module 108 may be associated with the same feature selection and other statistic characteristics during calculation of each level of the hierarchy 106.

In other example scenarios, however, the hierarchy manager 110, e.g., the level manager 120, may select a different cluster algorithm module 108 for different levels of the hierarchy 106. Somewhat similarly, the level manager 120 may be configured to utilize different feature selections and associated statistical calculations for each level of the hierarchy 106, when using either the same or different cluster algorithm module 108. Various other additional or alternative implementations and operations of the system 100 of FIG. 1 are described herein, or would be apparent to one of skill in the art.

In the example of FIG. 1, the cluster controller 102 is illustrated as executing on at least one computing device 124, which may include or be associated with at least one processor 124A and a computer readable storage medium 124B. Again, however, it may be appreciated that many various configurations of the system 100 may be implemented beyond the examples illustrated and described with respect to FIG. 1.

For example, different elements of the cluster controller 102 may be executed using different computing devices (e.g., a remote computer and a local computer which are connected by a particular network). In other examples, elements and components of the system 100 which are illustrated singularly may be implemented using two or more separate subcomponents. Conversely, elements and components illustrated separately from one another may be executed within a single module. These and other configurations of the system 100 may be understood to represent matters of design choice that would be apparent to one of skill in the art, and therefore are not discussed herein in further detail, except as may be necessary or helpful in understanding operations of the system 100 of FIG. 1.

Figure 2:
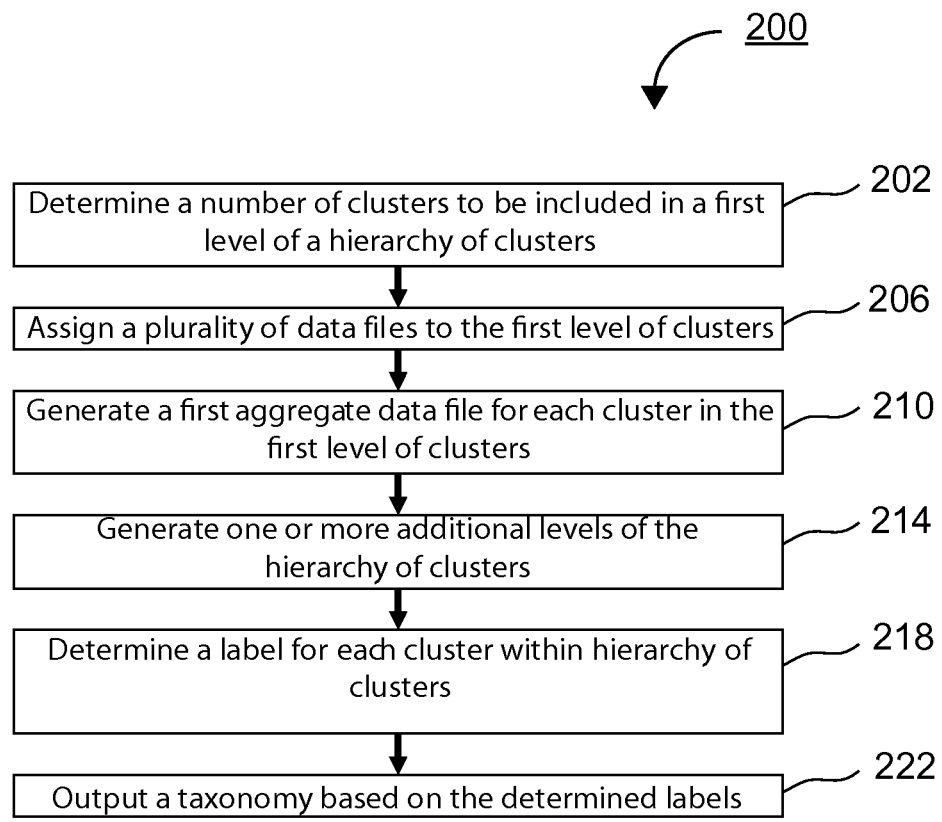

FIG. 2 is a flowchart 200 illustrating an exemplary operation of the system 100 of FIG. 1. In the example of FIG. 2, operations 202-222 are illustrated in sequential order. However, it may be appreciated that the flowchart 200 illustrates non-limiting examples of operations of the system 100 of FIG. 1. For example, two or more operations of the operations 202-222 may be executed in a partially or completely overlapping or parallel manner. In other examples, operations may be performed in a different order than that shown. Further, additional or alternative operations may be included.

In the exemplary embodiment illustrated in FIG. 2, a number of clusters to be included in a first level of a hierarchy of clusters is determined 202. For example, the level manager 120 may be configured to receive a first level 106A of the hierarchy 106 having a predetermined number of clusters. For example, the level manager 120 may receive the designated number of clusters to be included in the first level 106A of the hierarchy 106 from the user of the system 100, e.g., by way of a graphical user interface (GUI) having appropriate text entry fields for entering a desired number of levels.

As described herein, additional information related to the hierarchy 106 also may be received in conjunction with the determination of the number of clusters to be included in the first level 106A of the hierarchy 106. For example, the user of the system 100 may further specify a number of levels 106A-106C to be included/created. Further, the user may designate a particular cluster algorithm module 108 used in executing clustering with respect to some or all of the levels 106A-106C, i.e., may specify a particular cluster algorithm module 108 for each level, or may designate a single cluster algorithm module 108 for all of the levels 106A-106C. In still further examples, the user may designate, using the level manager 120, particular parameters for feature selection and/or statistic calculation that are to be associated with each or all of the levels 106A-106C.

A current level of the levels of the cluster hierarchy 106 may be obtained by providing a current input to at least one clustering algorithm to thereby obtain a current output of the at least one clustering algorithm, where the current output includes a current plurality of clusters and defines the current level. More specifically, a plurality of content files may be assigned 206 to a plurality of clusters in the first level 106A of the hierarchy 106. For example, the current input may include the plurality of content files 104 which are provided by the hierarchy manager 110 to the cluster algorithm module 108, to thereby obtain a resulting set of clusters thereof, thereby defining the first level 106A of the hierarchy 106.

Content information associated with each cluster of the current output from the at least one clustering algorithm is aggregated 210 to obtain a first aggregate data file for each cluster of the first level 106A. For example, the aggregator 118 may aggregate content information for each cluster at the first level 106A. For example, as described, such aggregation may include aggregation of actual content of content files within each cluster (e.g., concatenation of text within the content files of each cluster), or may include information characterizing the content. For example, as also described, the statistics compiler 122 may be configured to execute the aggregation by compiling statistics or all content files of a given cluster to serve as the aggregated content information.

The plurality of first aggregate data files is provided as an input to the at least one clustering algorithm to generate 214 one or more additional levels, such as the second level 106B and/or the third level 106C, of the hierarchy 106 of clusters. For example, the output of the aggregator 118 in the form of the first aggregate data files is provided by the hierarchy manager 110 to the cluster algorithm module 108 to obtain a plurality of clusters that are included in the second level 106B of the hierarchy 106.

In some embodiments, the steps of generating aggregate data files and generating additional levels are repeated in order to produce the desired number of levels. In the exemplary embodiment, the third level 106C is generated by generating a second aggregate data file for each cluster in the second level 106B of clusters and providing the plurality of second aggregate data files to the clustering module 108, which outputs the third level 106C of the hierarchy 106. It should be appreciated that additional levels may be generated by repeated iterations of the steps of aggregating the current level and providing the aggregate data files of the current level to the at least one clustering algorithm. For example, the hierarchy manager 110 may obtain the aggregated content information for the various clusters of the third level 106C, so that the thus obtained aggregated content information may serve as the new current input to the cluster algorithm module 108, which may thus output resulting clusters defining the new current level, i.e., a fourth level of the hierarchy 106.

Thereafter, a label for each cluster in each level of the hierarchy 106 is determined 218. For example, the operator of system 100 may be presented, e.g., using a GUI, with a current cluster by the label manager 130. The presentation of the current cluster may include cluster contents, metadata about cluster contents, and/or statistical information about the current cluster or its contents. The operator may input a label, e.g., using a GUI, for the current cluster, and the label manager 130 may affiliate the label with the current cluster. The label manager 130 may then iterate through each cluster of hierarchy 106 to determine the label for each cluster in hierarchy 106. Alternatively, or additionally, the label manager 130 may select a random cluster to be presented to the operator of system 100. It should be appreciated that more than one operator may input labels for hierarchy 106, and that the task of reviewing clusters and providing a label may be distributed to other systems and/or remote users.

For example, the operator of system 100 may provide labels for the clusters in the first level 106A by reviewing the content files found within each cluster of the first level 106A. Thereafter, the operator of system 100 may provide labels for the clusters in the second level 106B by reviewing statistical information about each cluster of the second level 106B. For example, the operator of system 100 may be presented with word counts for a cluster of the second level 108B. Alternatively, the operator of system 100 may be presented with the labels of the first level 106A in order to determine the labels for the second level 106B. Labels for the third level 106C and subsequent levels may be determined 222 in the same manner as the first level 106A or the second level 106B. It should be appreciated that labels for each level of the hierarchy 106 may be more generic than the labels of the preceding level, or the content files 104 in the case of the first level 106A.

Thereafter, the labels may be reviewed using the label manager 130 to determine if two or more clusters within a specific level 106A-106C of hierarchy 106 are sufficiently related, such that the two or more related clusters may be merged to form a single cluster. For example, if labels describe various customer issues and the contents of two or more clusters are so closely related that the two or more issues may be considered to be the same issue, then the clusters may be merged. For example, through the random sampling and manual labeling of clusters, two operators may have been presented with clusters that contain substantially similar content files 104, however the two operators provided labels that had slightly different wording. Upon review, these two clusters may be merged by the label manager 130.

The hierarchy 106 and the labels determined by the label manager 106 may be provided as inputs to the taxonomy manager 134 in order to output 222 a taxonomy based on the determined labels. For example, the hierarchy 106 may have been modified by label manager 130 such that each cluster within hierarchy 106 contains the determined label. Alternatively, label manager 130 may store determined labels separately from the hierarchy 106 and provide references to corresponding clusters within the hierarchy 106. For example, if the hierarchy 106 contains labels, the taxonomy manager 134 may generate the taxonomy 140 by removing the content files in each cluster such that the taxonomy 140 resembles a tree with the labels as nodes. Alternatively, the taxonomy manager 134 may generate the taxonomy 140 by outputting 222 a hierarchy 106 that includes clusters that each have both the content files that are clustered and the corresponding label. In other words, and without limiting the generality of the foregoing examples, the taxonomy may mirror the hierarchy of clusters by representing each cluster as a node in a tree.

It should be appreciated that the taxonomy that is output 222 by the taxonomy manager 134 may be represented in any manner that preserves information about the relationships among the clusters in the hierarchy 106, such as, but not limited to, a tree. For example, the taxonomy may be represented by an acyclic connected graph having labeled nodes that each have zero or more children nodes and at most one parent node. The taxonomy may be stored and/or transmitted using any suitable technique. For example, the taxonomy may be stored in temporary memory using pointers, and/or the taxonomy may be serialized to facilitate storage and/or transmission of the taxonomy. Outputs of the taxonomy may include, but are not limited to, displaying the taxonomy with a GUI, transmitting a serialized representation of the taxonomy to a remote system, and/or passing references to an in-memory taxonomy to a component of system 100.

Figure 3:
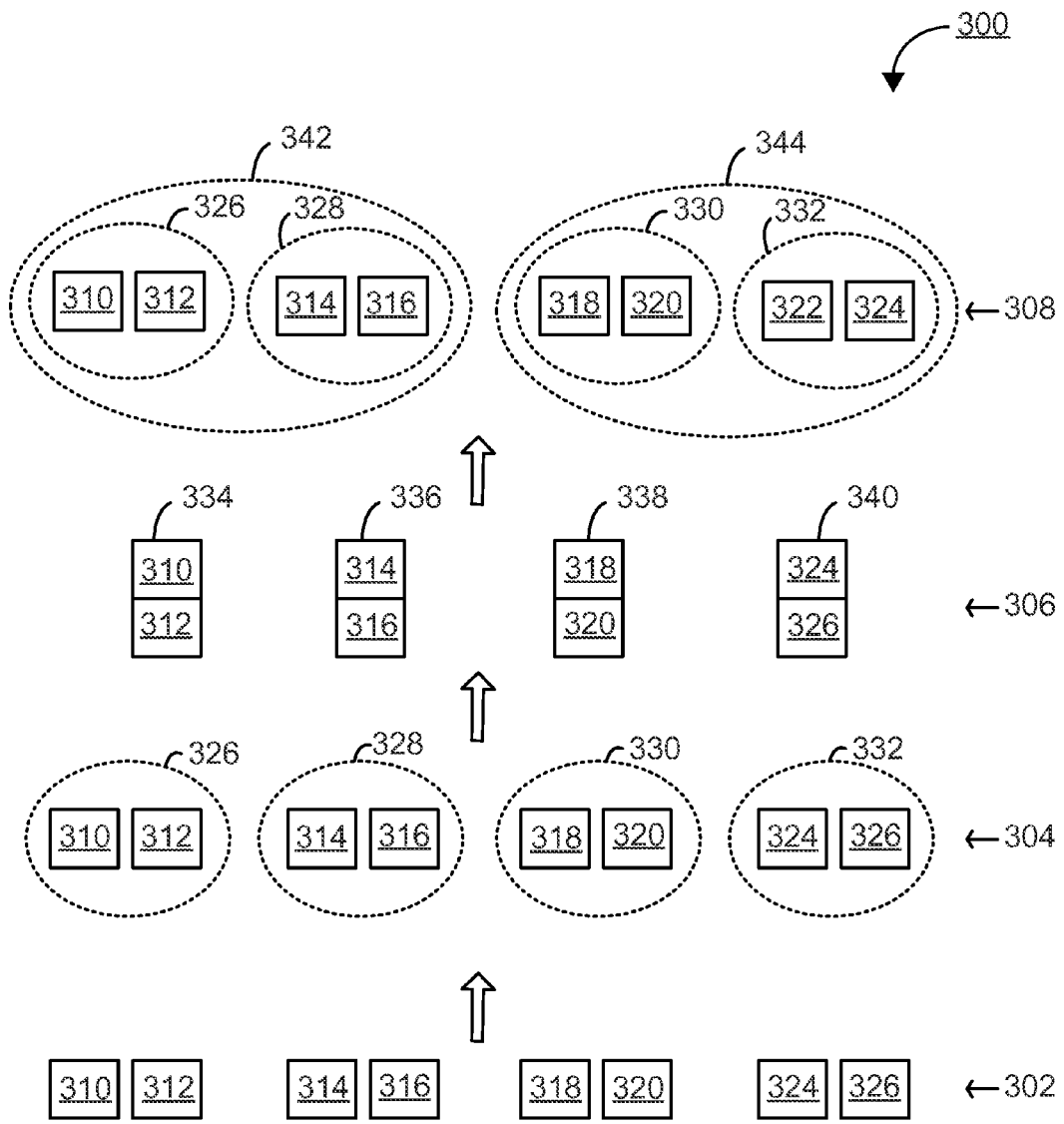

FIG. 3 is a block diagram illustrating an example of hierarchal clustering using the system 100 of FIG. 1. In the example of FIG. 3, a plurality of content files 302 are illustrated which may be understood to be analogous to the content files 104 of FIG. 1. As described in detail below, the content files 302 may be clustered to form a level 304 of a cluster hierarchy, such as the cluster hierarchy 106 of FIG. 1. Subsequently, the clusters of the level 304 may have content information aggregated for each cluster to obtain aggregated content information 306. Finally in FIG. 3, the aggregated content information may be used to execute further clustering to thereby obtain a second level 308 of a cluster hierarchy.

In more detail, the content files 302 may include a plurality of text based documents 310-324, as shown. To give a specific example, it may occur that a user of the system 100 has previously solicited feedback from users of a graphical user interface which the operator of the system 100 wishes to evaluate and improve. Thus, the content files 310-324 may each represent separate documents obtained from the users of the graphical user interface, and may each contain feedback from each user regarding the graphical user interface.

In the example, the operator of the system 100 may wish to cluster the documents 310-324 based on some initial clustering criteria and associated selected features to obtain the level 304. For example, the operator may cluster the documents 310-324 based on such meta information as a source or origin of a given document, or based on a time of collection of a given document. The operator may execute clustering based on particular words, phrases, or concepts contained within each document 310-324, such as, e.g., whether the documents include positive or negative feedback regarding the graphical user interface.

Subsequently, the user may wish to form the second level 308 of the cluster hierarchy by clustering the aggregated content information 306 based on specific characteristics and desired feedback associated with the graphical user interface. For example, the operator of the system 100 may wish to have a first cluster which includes feedback related to an aesthetic or visual appearance of the graphical user interface, while having a second cluster related to substantive review(s) of content and functionality associated with the graphical user interface.

Thus, with reference to FIGS. 1 and 2, it may be appreciated that an operator of the system 100 may initially proceed by designating the documents 310-324 for clustering. The operator may utilize the level manager 120 to designate the operator desired for two levels (i.e., the levels 304, 308), to be included within the cluster hierarchy. The operator may further specify a desire for a certain number of clusters at each level 304, 308. In other examples, the operator may obtain similar results by specifying different parameters, e.g., by specifying a designated maximum number or minimum number of documents to be included within each cluster of a given level, without necessarily limiting the number of clusters at that level.

The operator may further designate desired results by specifying cluster algorithm modules 108 and/or associated feature selections of the one or more selected cluster algorithm modules, in order to obtain the results referenced above. In other words, for example, the operator of the system 100 may obtain desired results by utilizing a single cluster algorithm module 108 to determine the two cluster levels 304-308, and/or by designating corresponding appropriate feature selections for use by the cluster algorithm module. In additional or alternative examples, the operator of the system 100 may simply use a different cluster algorithm module for each of the two desired levels 304, 308.

In operation, then, the level manager 120 may initially provide the documents 310-324 to the appropriate cluster algorithm module 108. As described above, the statistic collector 112 may collect designated statistics regarding each of the documents 310-324 for storage thereof within the statistics repository 114. Using this information, the cluster calculator 116 may output clusters 326, 328, 330, and 332, to thereby form the level 304 of the hierarchy. FIG. 3 illustrates a simplified example in which the cluster 326 includes documents 310, 312, the cluster 328 includes 314, 316, the cluster 330 includes the documents 318, 320, and the cluster 332 includes the documents 322, 324.

Subsequently, as referenced above and described herein, the aggregator 118 may be configured to aggregate content information associated with content of the documents contained within each cluster 326-332. For example, with reference to the cluster 326, the aggregator 118 may be configured to obtain aggregated content information for the included documents 310, 312. In the example of FIG. 3, aggregated content information 334 is illustrated as an aggregation of content information associated with documents 310, 312.

As referenced above, the aggregated content information 334 may include an aggregation of the actual content 310, 312. For example, in the case where the documents 310, 312 include text, the aggregated content information 334 may include a concatenation of the text of the documents 310, 312.

In other examples, however, as also described above, the aggregated content information 334 may include a compilation of the statistics associated with the document 310 together with statistics calculated for the document 312. In other words, as described, the statistics compiler 322 may be configured to compile statistics for the documents 310, 312 from the statistics repository 114 to thereby obtain the aggregated content information 334. As may be appreciated, it may be more efficient for the aggregator 118 to utilize the statistics compiler 122 to directly aggregate statistical information within the statistics repository 114, e.g., to thereby reduce or eliminate redundant efforts in determining the statistics from a concatenated or otherwise aggregated version of the document 310, 312.

Similarly, the aggregator 118 and/or the statistics compiler 122 may be configured to obtain aggregated content information 336 associated with the documents 314, 316 of the cluster 328. Further, aggregated content information 338 may similarly be obtained for the documents 318, 320 of the cluster 330, while aggregated content information 340 may be obtained for the documents 322, 324 of the cluster 332.

As described herein, regardless of whether the aggregated content information 334-340 includes actual content of the underlying content files, statistical information regarding the content, or other information related to the content, the aggregated content information is of a form which is suitable for input to the one or more cluster algorithm modules 108.

Specifically, in the example where the documents 310-324 include text, it may be appreciated that the resulting aggregated content information 334-340 may include concatenated content (e.g., text) suitable for input to the statistics calculator 112, or, in other described examples the aggregated content information 334-340 may include compiled statistics regarding the corresponding underlying documents, which are directly suitable for input to the cluster calculator 116. Consequently, the cluster calculator 116 may be configured to utilize the aggregated content information 334-340 to calculate clusters 342, 344 of the level 308 of the resulted cluster hierarchy.

As shown and described, it may be appreciated that the cluster 342 at the higher/second level 308 includes underlying clusters 326-328, which themselves include documents 310/312 and 314/316, respectively. Similarly, the cluster 344 includes underlying clusters 330, 332 which themselves include documents 318/320 and 322/324, respectively, as shown. Thus, it may be appreciated that the cluster levels 304 and 308 provide an organization of underlying documents 310-324 and information contained therein, in a manner which facilitates access to, and use of, the documents and associated information by operator of the system 100.

Consequently, it may be possible for the operator of the system 100 to discern patterns, trends, or other meta information about the user feedback, in this example. For example, the operator may notice that a large majority of the documents (i.e., user feedback) fall into the cluster 342 at the level 308 which is related to a visual layout of the graphical user interface, while only a small minority of the user feedback is included within the cluster 344 of the level 308 associated with substantive feedback regarding content or function of the graphical user interface. Then, the operator of the system 100 may focus efforts accordingly when responding to the user feedback (e.g., when seeking to improve the underlying graphical user interface).

Of course, as may be appreciated from the above description, the specific example given with respect to FIG. 3 should be considered to be non-limiting with respect to operations of the system 100. For example, the content files 310-324 may include image files. In such examples, the aggregated content information 334-340 may include tiled images of the images within the corresponding underlying content files, and/or may include meta data for each corresponding image file.

Figure 4:
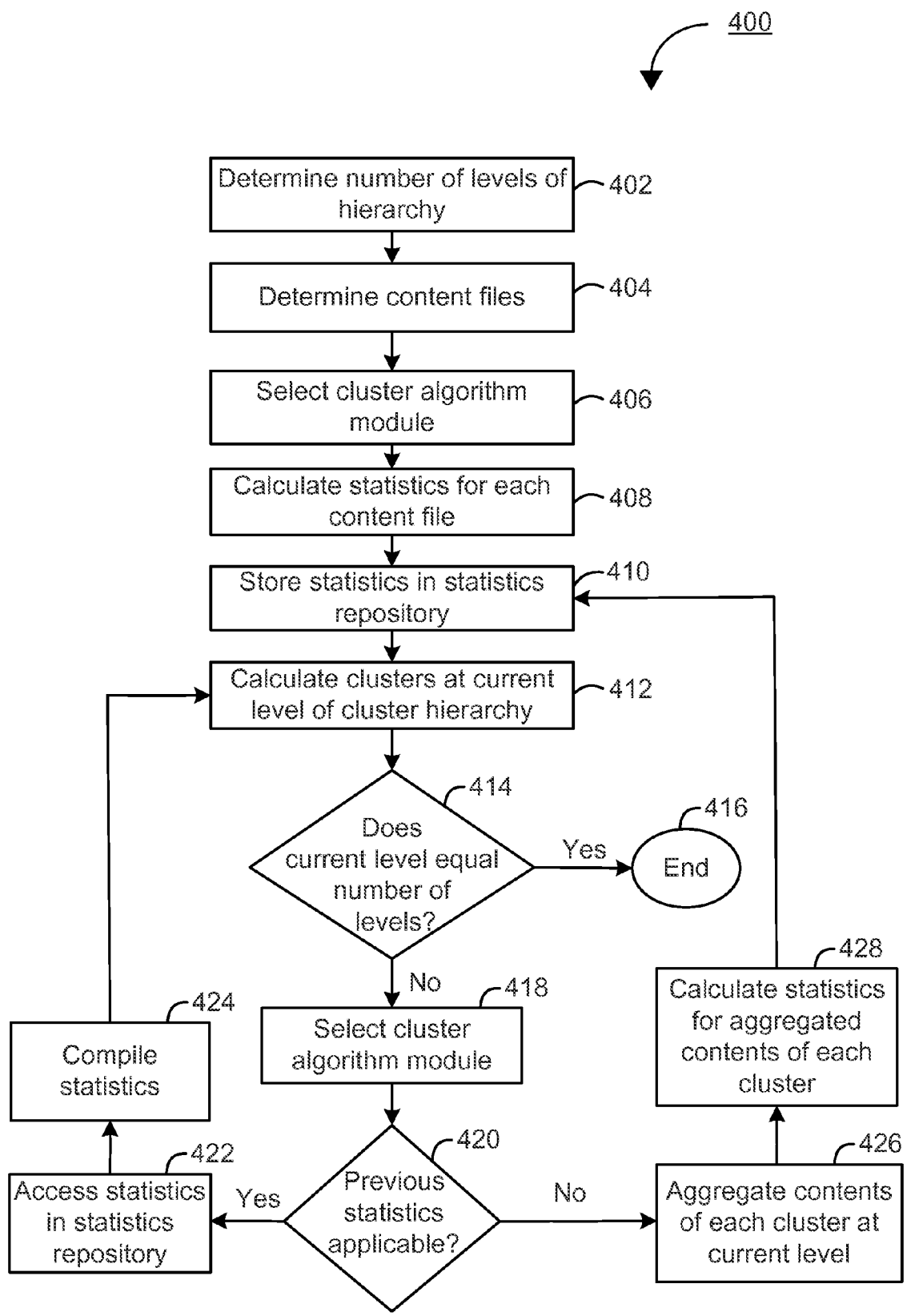

FIG. 4 is a flowchart 400 illustrating more detailed examples of the operations of the system 100 of FIG. 1. In the example of FIG. 4, a number of levels of a cluster hierarchy may be determined 402. For example, an operator of the system 100 may input a desired number of levels of the hierarchy using the level manager 120. In the example of FIG. 3, as just described, the number of levels may equal two (i.e., the levels 304, 308).

Content files to be clustered are also determined 404. For example, as just described, the content files may include the documents 310-324.

An appropriate cluster algorithm module may be selected 406 for execution of clustering of the content files to produce an initial level of the hierarchy as a current level. For example, the level manager 120 may select one of the cluster algorithm modules 108 in accordance with instructions from the operator.

Statistics for each content file may be calculated 408. For example, the statistics calculator 112 may calculate statistics regarding unique words, phrases, or other content within each of the documents 310-324, and may thereafter store 410 such statistics within the statistics repository 114.

Clusters at the current level of the cluster hierarchy may then be calculated 412. With reference to the example of FIG. 3, for example, the first/initial level 304 may be calculated as the current level and determined to include the clusters 326-332, as described above.

If the current level of the hierarchy equals the originally-designated number of levels 414, then the process 400 may end 416. If, however, as in the example of FIG. 3, the current level does not yet equal the designated number of levels 414, then the process may proceed with selection 418 of the same or different cluster algorithm modules 108, in accordance with instructions from the operator of the system 100.

Subsequently, a determination 420 may be made by the aggregator 118 as to whether the previously calculated and stored statistics remain applicable. In other words, the aggregator 118, considering the existing selection of the designated cluster algorithm module and/or associated feature selection, may determine whether the statistics within the statistics repository 114 are suitable for proceeding with obtaining the aggregated content information for input to the currently-selected cluster algorithm module 108.

If so, then the statistics compiler 122 may access 422 the corresponding statistics within the statistics repository 114, and may proceed with compiling 424 the determined statistics. Subsequently, the cluster calculator 116 may proceed with calculating 412 the next level (i.e., the second level 308), as the new current level of the cluster hierarchy. In the example, this new current level equals 414 the originally-designated number of levels, so that the process 400 may end 416.

However, as described herein, it may occur that previous statistics are not applicable for execution of the designated cluster algorithm module and associated feature selection to be used for calculating a next/new current level of the hierarchy 420. For example, with respect to determining aggregated content information for audio files, it may be difficult to utilize previously compiled statistics for the audio files to calculate further clusters thereof at the next/second level of the cluster hierarchy.

In this case, a separate process flow is illustrated in which the contents of each cluster are aggregated 426 as such at the current level. Again with reference to the example of FIG. 3, such a process flow would indicate that the aggregated content information 334-340 each includes aggregated contents of corresponding underlying content files. Of course, operation 426 is merely an example, and other techniques may be employed for calculating aggregated content information when some or all of the previously calculated and stored statistics are not suitable for direct compilation and input to the cluster calculator 116. In the example of FIG. 4, however, the process continues with calculation 428 of statistics for the aggregated contents of the content files of each cluster, whereupon the newly calculated statistics may be stored 410 within a statistics repository 114.

Then, again, as described above, operations may proceed with calculation 412 of the current (i.e., second) level of the cluster hierarchy. As described, in the example, this current level in fact equals 414 the originally-designated number of levels, so that the process 400 may complete.

As described herein, a single (flat) level of clustering may not be sufficient to describe the structure and interrelationships of the included content. A hierarchical set of clusters (e.g., clusters of clusters) may be useful to allow for improved access and comprehension of the data. However, such techniques may rely on different algorithms and assumptions about the data as compared to an appropriately chosen flat clustering method. In addition, many flat clustering methods are available, and therefore it is likely that an implementation of such a method will be found that is very well suited for the data characteristics of a particular implementation. This present description thus provides techniques for utilizing existing or new flat clustering methods to generate a hierarchy of clusters, thus making hierarchical clustering available to problems, which hitherto only had meaningful clustering solutions under flat clustering methods.

Figure 5:
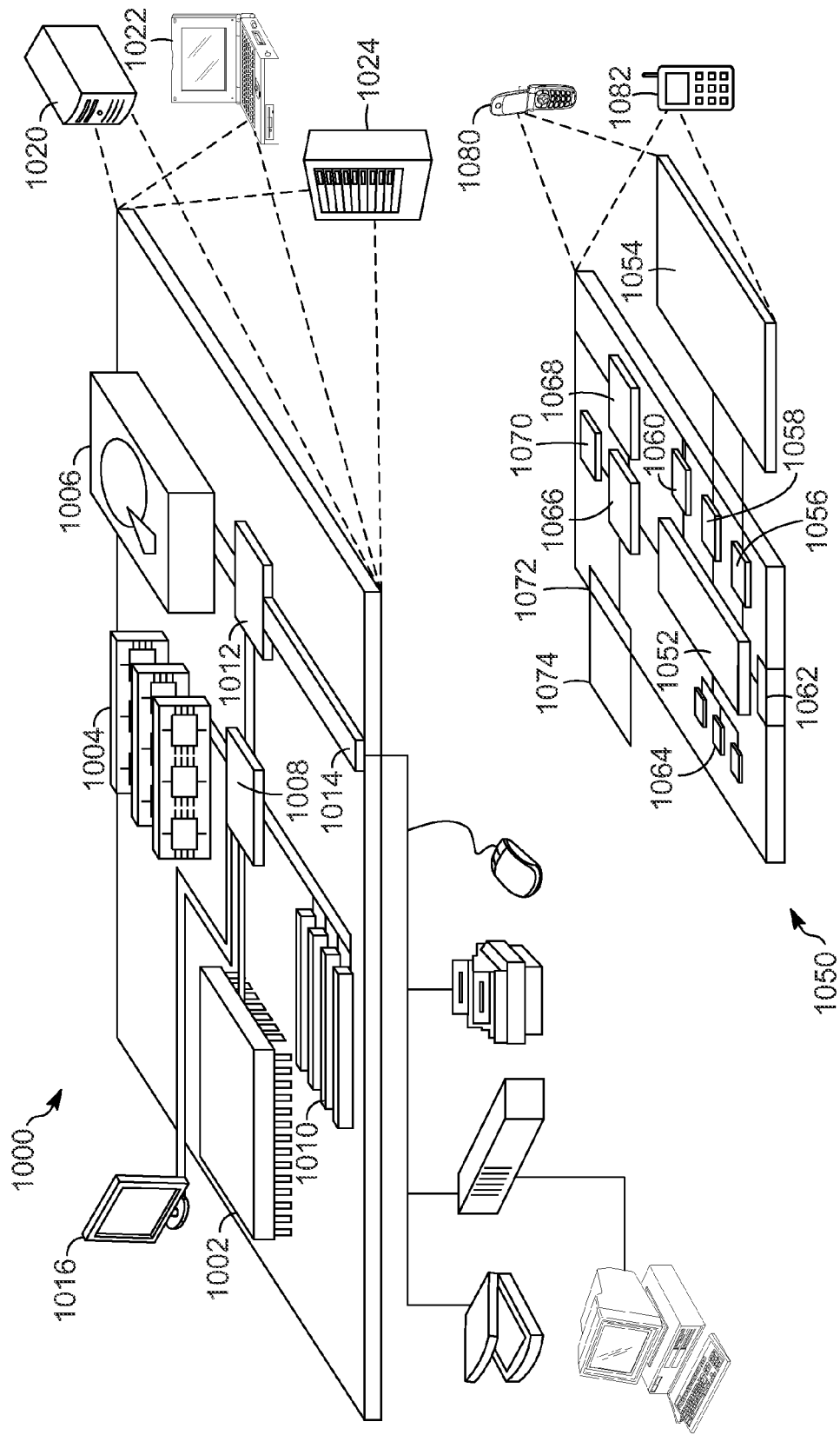

FIG. 5 is a block diagram showing example or representative computing devices and associated elements that may be used to implement the systems of FIGS. 1 and 3. FIG. 10 shows an example of a generic computing device 1000 and a generic mobile computing device 1050, which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface or controller 1008 connecting to memory 1004 and high-speed expansion ports 1010, and a low-speed interface or controller 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed controller 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed bus 1014. The low-speed bus 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 550. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others.

Such communication may occur, for example, through radio-frequency transceiver 1068. In addition, short-range communication may occur, such as using a Bluetooth, WiFi, or other such transceiver (not shown). In addition, GPS (Global Positioning system) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 1000 and/or 1050) that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing devices 1000 and 1050 are configured to receive and/or retrieve electronic documents from various other computing devices connected to computing devices 1000 and 1050 through a communication network, and store these electronic documents within at least one of memory 1004, storage device 1006, and memory 1064. Computing devices 1000 and 1050 are further configured to manage and organize these electronic documents within at least one of memory 1004, storage device 1006, and memory 1064 using the techniques described herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the invention may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer system including instructions stored on one or more computer-readable medium and executable by one or more processors, the computer system comprising:
   a statistic calculator configured to receive a plurality of content files and to determine at least one statistical measure of the content of the plurality of content files, said statistic calculator configured to store the at least one statistical measure within a statistics repository;
   a cluster controller configured to cause the one or more processors to generate a hierarchy of clusters based on the at least one statistical measure stored in the statistics repository, wherein the hierarchy of clusters comprises at least two levels, each cluster within a first level of the hierarchy of clusters comprising at least one content file, each cluster within a second level of the hierarchy of clusters comprising at least one cluster of the first level of the hierarchy of clusters;
   an aggregator configured to aggregate the content files of each cluster, and transmit the aggregated content file to said cluster controller to form a third level of the hierarchy of clusters;
   a label manager configured to cause the one or more processors to determine a label for each cluster within the hierarchy of clusters based on the at least one statistical measure, the label identifying a topic of information contained within each cluster, the topic related to at least one of a problem experienced by a user and a request for assistance in solving the problem; and
   a taxonomy manager configured to cause the one or more processors to output a taxonomy based on the hierarchy of clusters and the determined labels.

2. The computer system of claim 1, wherein said cluster controller further comprises at least one cluster algorithm module, said at least one cluster algorithm module configured to assign the at least one content file to each cluster within the first level of the hierarchy of clusters.

3. The computer system of claim 2, wherein said cluster controller further comprises an aggregator, said aggregator configured to generate a first aggregate data file for each cluster in the first level of the hierarchy of clusters.

4. The computer system of claim 3, wherein said at least one cluster algorithm module is further configured to generate the second level of the hierarchy of clusters using the first aggregate data file for each cluster in the first level of the hierarchy of clusters.

5. The computer system of claim 3, wherein said aggregator is configured to concatenate contents of the content files within each cluster.

6. The computer system of claim 1, wherein said cluster controller is further configured to generate a third level of the hierarchy of clusters, each cluster within the third level of the hierarchy of clusters comprising at least one cluster of the second level of the hierarchy of clusters.

7. The computer system of claim 1, wherein the taxonomy that is output by said taxonomy manager is a tree having labeled nodes.

8. One or more non-transitory computer-readable media having computer-executable instructions embodied thereon, wherein when executed by one or more processors, the computer-executable instructions cause the one or more processors to:
- receive a plurality of content files;
- determine at least one statistical measure of the content of the plurality of content files:
- store the at least one statistical measure within a statistics repository for a content of the plurality of content files;
- determine a number of clusters to be included in a first level of a hierarchy of clusters;
- assign a plurality of content files to the first level of the hierarchy of clusters based on the at least one statistical measure stored in the statistics repository;
- generate a first aggregate data file of the content files for each cluster in the first level of the hierarchy of clusters;
- cluster the aggregate data file to generate a second level of the hierarchy of clusters;
- aggregate the content files of each cluster;
- form a third level of the hierarchy of clusters using the aggregated content file:
- determine a label for each cluster in the hierarchy of clusters based on the at least one statistical measure, which identifies a topic of the content files within the cluster, the topic related to at least one of a problem experienced by a user and a request for assistance in solving the problem; and
- output a taxonomy based on the determined labels.

9. The one or more non-transitory computer-readable media of claim 8, wherein determining a number of clusters to be included in a first level of the hierarchy of clusters comprises receiving user input.

10. The one or more non-transitory computer-readable media of claim 8, wherein generating a first aggregate data file for each cluster in the first level the hierarchy of clusters comprises concatenating contents of the content files within each cluster in the first level the hierarchy of clusters.

11. The one or more non-transitory computer-readable media of claim 8, wherein assigning a plurality of content files to the first level of the hierarchy of clusters comprises calculating statistical information about each of the content files assigned to each cluster within the first level of the hierarchy of clusters.

12. The one or more non-transitory computer-readable media of claim 11, wherein generating a first aggregate data file for each cluster in the first level of the hierarchy of clusters comprises concatenating the statistical information associated with each cluster within the first level of the hierarchy of clusters.

13. The one or more non-transitory computer-readable media of claim 8, further comprising instructions to selectively merge a plurality of clusters.

14. The one or more non-transitory computer-readable media of claim 8, further comprising instructions to generate a second aggregate data file for each cluster within the second level of the hierarchy of clusters.

15. The one or more non-transitory computer readable media of claim 14, further comprising instructions to generate a third level of the hierarchy of clusters.

16. A computer-implemented method including executing instructions stored on a computer-readable medium, the method comprising:
- receiving a plurality of content files;
- determining at least one statistical measure of the content of the plurality of content files;
- storing the at least one statistical measure within a statistics repository of a content of a plurality of content files;
- determining a number of clusters to be included in a first level of a hierarchy of clusters;
- assigning a plurality of content files to the first level of the hierarchy of clusters by applying at least one clustering algorithm to the plurality of content files, wherein each cluster includes at least one content file;
- generating a first aggregate data file for each cluster in the first level of the hierarchy of clusters by aggregating content data of each content file included within each of the clusters included in the first level of the hierarchy of clusters;
- generating a second level of the hierarchy of clusters by providing each of the first aggregate data files to the at least one clustering algorithm;
- aggregating the content files of each cluster;
- forming a third level of the hierarchy of clusters using the aggregated content file;
- determining a label for each cluster included in the hierarchy of clusters based on the at least one statistical measure, which identifies a topic of the content files within the cluster, the topic related to at least one of a problem experienced by a user and a request for assistance in solving the problem; and
- outputting a taxonomy based on the determined labels.

17. The computer-implemented method of claim 16, further comprising selectively merging a plurality of clusters.

18. The computer-implemented method of claim 16, further comprising generating a second aggregate data file for each cluster within the second level of the hierarchy of clusters.

19. The computer-implemented method of claim 18, further comprising generating a third level of the hierarchy of clusters.

20. The computer-implemented method of claim 16, wherein determining a label for each cluster included within the hierarchy of clusters comprises receiving user input.

* * * * *